No. 628,304. Patented July 4, 1899.
A. DONNELLY.
KNOCKDOWN CRATE.
(Application filed May 1, 1899.)
(No Model.) 2 Sheets—Sheet 1.
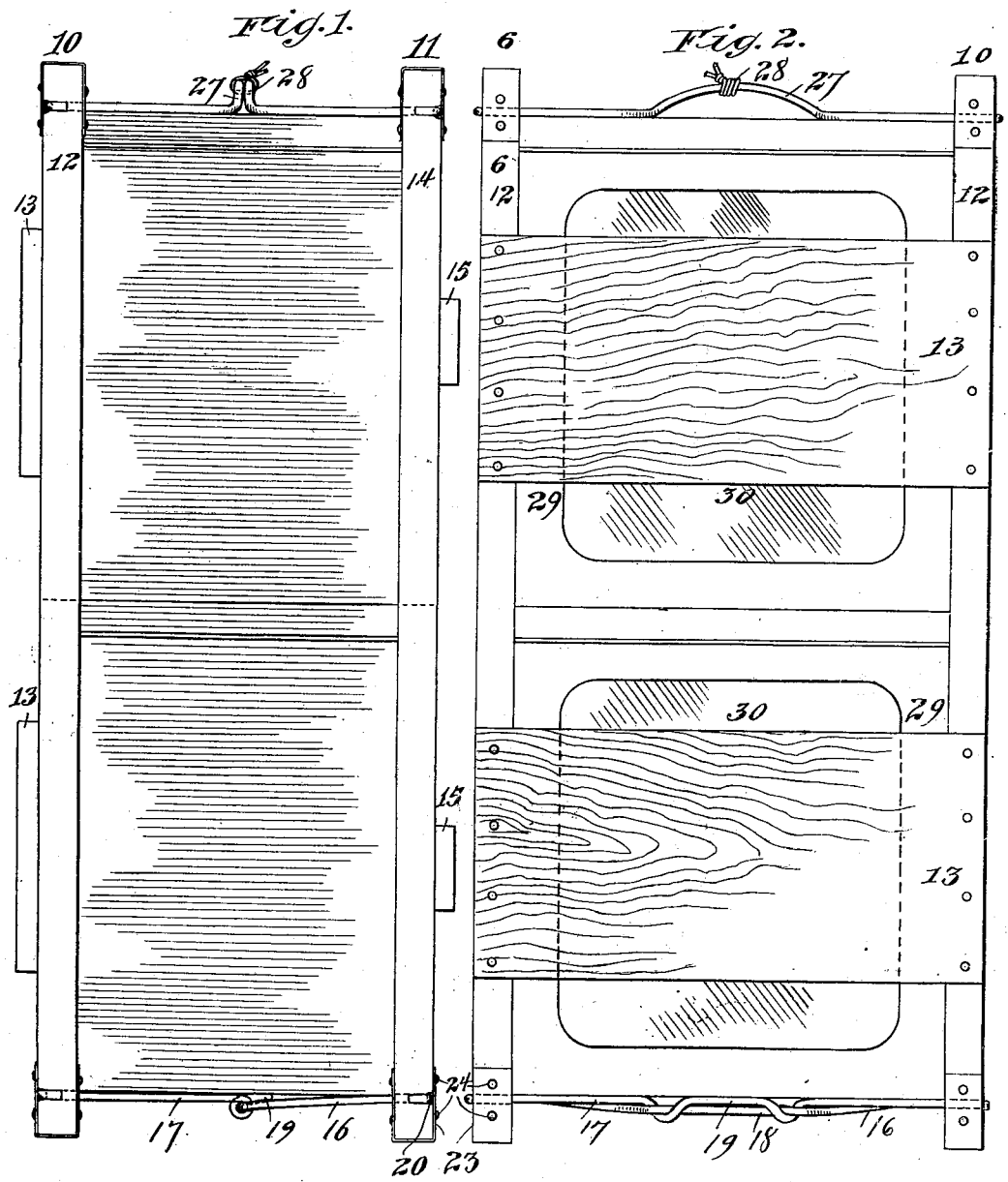

No. 628,304. Patented July 4, 1899.
A. DONNELLY.
KNOCKDOWN CRATE.
(Application filed May 1, 1899.)
(No Model.) 2 Sheets—Sheet 2.
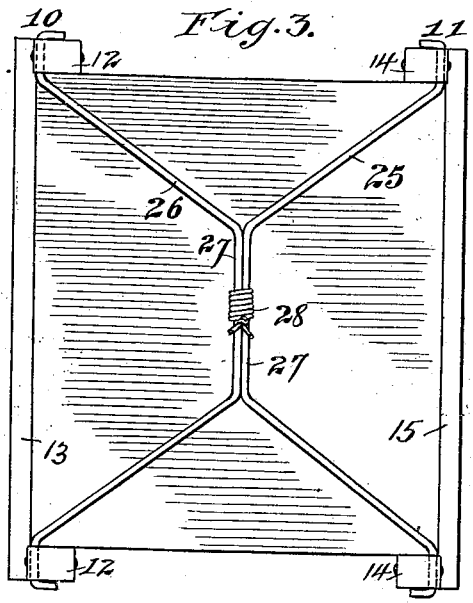
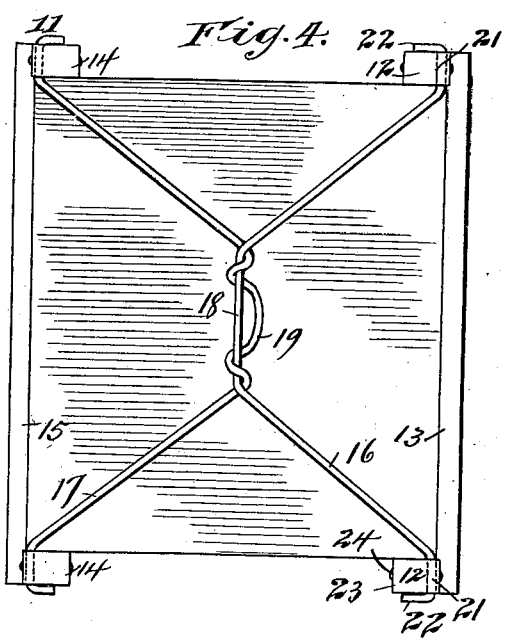
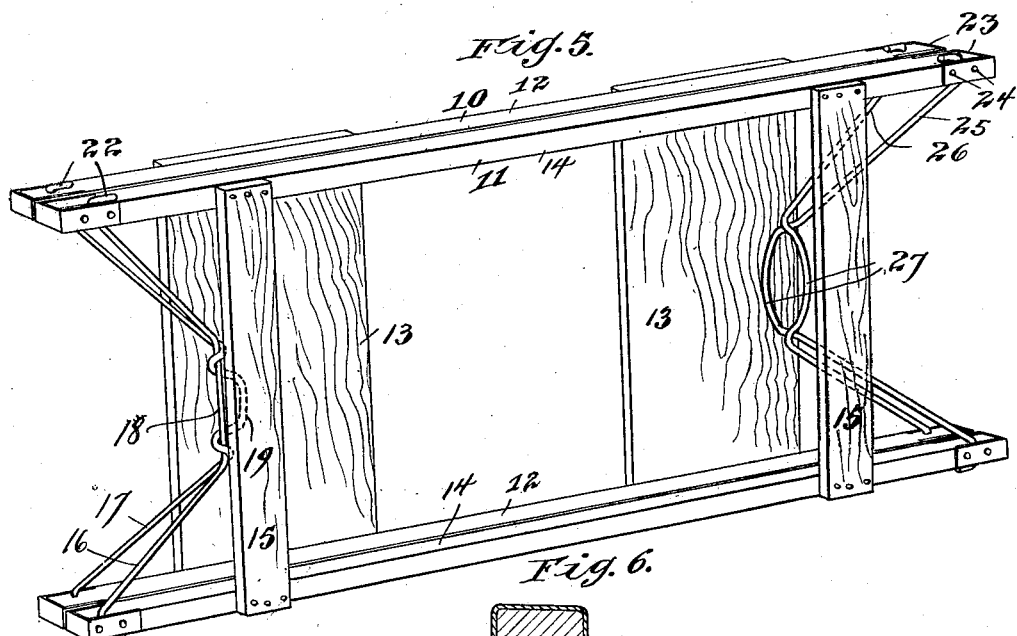
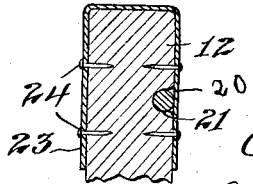

UNITED STATES PATENT OFFICE.

ARTHUR DONNELLY, OF TOLEDO, OHIO, ASSIGNOR TO THE NATIONAL BISCUIT COMPANY, OF JERSEY CITY, NEW JERSEY, AND CHICAGO, ILLINOIS.

KNOCKDOWN CRATE.

SPECIFICATION forming part of Letters Patent No. 628,304, dated July 4, 1899.

Application filed May 1, 1899. Serial No. 715,216. (No model.)

*To all whom it may concern:*

Be it known that I, ARTHUR DONNELLY, of Toledo, in the county of Lucas and State of Ohio, have invented certain new and useful Improvements in Knockdown Crates, of which the following is a specification.

This invention relates to knockdown or folding crates, and has for its object to provide a simple, strong, and inexpensive shipping-crate which when in use will effectually inclose and protect the goods to be shipped and may then be readily handled, while after shipment the crate may be readily knocked down or folded so as to occupy a comparatively small space, and thus be adapted for cheap return shipment.

The crate is more particularly adapted for use in the shipment of sheet-metal boxes in which biscuits or crackers are packed, such boxes being provided with a glass inset at one side in order to show the contents, although the crate is of course adapted for use in the packing and shipment of other similar boxes.

To the ends above set forth the invention consists in certain novel features, which I will now proceed to describe and will then particularly point out in the claims.

In the accompanying drawings, Figure 1 is a side elevation of a crate embodying my invention, the same being shown packed and ready for shipment. Fig. 2 is a front elevation of the same. Fig. 3 is a top plan view; Fig. 4, a bottom or inverted plan view; Fig. 5, a perspective view of the crate folded for return shipment; and Fig. 6, a detail sectional view, on an enlarged scale, taken on the line 6 6 of Fig. 2.

As shown in said drawings, the crate consists of two wooden members, which I designate as a whole by two reference-numerals 10 and 11, respectively. The former, which constitutes the front of the crate, is composed of two parallel upright bars 12, to the outer faces of which are secured the cross pieces or boards 13, which are of sufficient width to effectually cover and protect the glass portions of the inclosed boxes. The other member 11, which constitutes the back of the crate, is composed of two upright bars 14, similar to the bars 12, and of cross-pieces 15, secured to the outer faces of the bars 14. These connecting-pieces 15 may be of considerably less width than the connecting-pieces 13, as there is no glass to protect at the back of the boxes to be shipped. The front and back frames thus constructed are connected at top and bottom by means of wire bails arranged in pairs at the upper and lower ends of the front and back frames and forming the top and bottom of the crate when the same is set up ready for shipment. The lower bails, which are indicated at 16 and 17, respectively, have their extremities pivoted to the uprights 12 and 14, respectively, near the ends thereof, and said bails extend from these points of pivotal connection inward toward each other and are pivoted together at their central junction or meeting point. In the construction shown in the drawings each bail is made in a single piece, and the bail 16 is provided at its inner extremity with a straight cross-piece 18, while the bail 17 is made of greater length than the bail 16 and has its middle portion coiled around the cross-bar 18, as indicated at 19, so as to form a pivotal connection between the two bails. The pivotal connection between the extremities of the bails and the uprights 12 and 14 is effected in the following manner: There is formed in the outer face of each upright, near each end thereof, a groove 20, and each bail is turned outward at its end, as indicated in dotted lines at 21, to lie within said groove, and beyond said portion 21 the extremity of the bail is turned at right angles, as indicated at 22, to bear against the face of the upright and prevent the bail from being pulled out of the grooves longitudinally thereof. The ends of the bails are held against displacement from the grooves laterally by means of metallic strips 23, which are secured to the outer face of the uprights over the grooves by means of nails 24 or in any other suitable manner, and these strips are preferably carried around the extreme ends of the uprights, so as to form a metallic covering for the sides and ends thereof, as indicated in the drawings. The upper bails, which are indicated at 25 and 26, respectively, are pivotally connected to the upper ends of the uprights 12 and 14 in the manner just described. They are not, however, pivotally connected to each other at their meeting-point, but have parallel cross-bars 27, which are bowed upward, as shown more particularly in Fig. 2 of the drawings, and which are adapted to be tied together by a suitable binding connection, such as twine or string, as indicated at 28, in order to hold the crate in position around the inclosed boxes. Any suitable detachable connection between the bails 25 and 26 may be substituted for the string shown.

The crate thus constructed is adapted in the particular form shown for containing two biscuit-boxes of the ordinary size, these boxes being indicated at 29 and their glass insets at 30. In packing these boxes the front and back members or frames 10 and 11 are placed parallel to each other in a vertical position, and the lower box or case is placed between said frames or members so that it rests upon the lower bails 16 and 17, the sides of the box fitting between the uprights 12 and 14 and the front and rear of the box bearing against the front and rear cross-pieces 13 and 15. The upper box 29 is then similarly placed in position, or the two boxes may be placed in the crate at one and the same time, and the upper bails 25 and 26 are then brought together and detachably connected in the manner hereinbefore described. The completed crate thus formed incloses and protects the boxes, which are held between the uprights and cross-pieces in such a manner as to prevent displacement laterally or in a horizontal direction, while the frames or members 10 and 11 are held together by the bails and the bails prevent vertical displacement of the boxes. The packages may be readily uncrated by disconnecting the upper bails 25 and 26, when the front and back frames or members may be turned down into a horizontal position and the boxes removed. The crate when unloaded may be folded flat into the position shown in Fig. 5, in which position it will occupy a comparatively small space and may be readily stored or shipped, according to whether it is desired to return the empty boxes in the same crate or return the empty crate to the source from which it came.

The crate thus constructed is exceedingly light and strong and at the same time offers ample protection to the boxes and to the contents thereof during shipment. Moreover, when the crate is assembled and the upper bails connected together their upwardly-bowed central portions form a convenient hand-grasp, by means of which the crate may be handled.

It is obvious that the details of construction may be modified without departing from the principle of my invention. For instance, although I have shown a crate adapted to accommodate two boxes only the size of the crate may be varied so as to adapt it to accommodate a greater or smaller number of boxes. Other modifications will readily suggest themselves, and I therefore do not wish to be understood as limiting myself to the precise construction hereinbefore described, and shown in the drawings.

I claim—

1. A knockdown crate of the character described, comprising a front and a rear frame or member, said frames being connected at one end by bails pivotally connected to the frames and to each other, and at the other end by bails pivotally connected to the frame and detachably connected to each other, substantially as described.

2. A knockdown crate of the character described, comprising a front and a rear frame or member each consisting of two uprights and transverse connecting-pieces secured to the outer faces of the uprights, bails pivoted to the lower ends of said frames and to each other, and bails pivotally connected to the upper end of said frames and detachably connected to each other, substantially as described.

3. A knockdown crate of the character described, comprising a front and a rear frame, two bails having their extremities pivotally connected with the lower ends of said frames, one of said bails having a straight central portion, and the other of said bails having its central portion coiled around the straight portion of the first-mentioned bail, and two other bails having their extremities pivotally connected to the upper ends of the frames and their central portions adapted to be detachably connected to each other, substantially as described.

4. In a knockdown crate of the character described, the combination, with the wooden frames having uprights grooved in their outer faces near their ends, of connecting-bails having their end portions seated in said grooves and their extremities bent at right angles, and metallic strips secured to the outer faces of the uprights and covering the grooves, substantially as described.

5. In a knockdown crate of the character described, the combination, with the front and rear frames, and the lower bails pivotally connected to the lower ends of said frames and to each other, of the upper bails pivotally connected to the upper ends of said frames and having their central portions arranged parallel or side by side and bowed or bent to form a hand-grasp, substantially as described.

ARTHUR DONNELLY.

Witnesses:
RALPH S. HOLBROOK,
JEROME H. SMITH.